United States Patent Office 3,265,878
Patented August 9, 1966

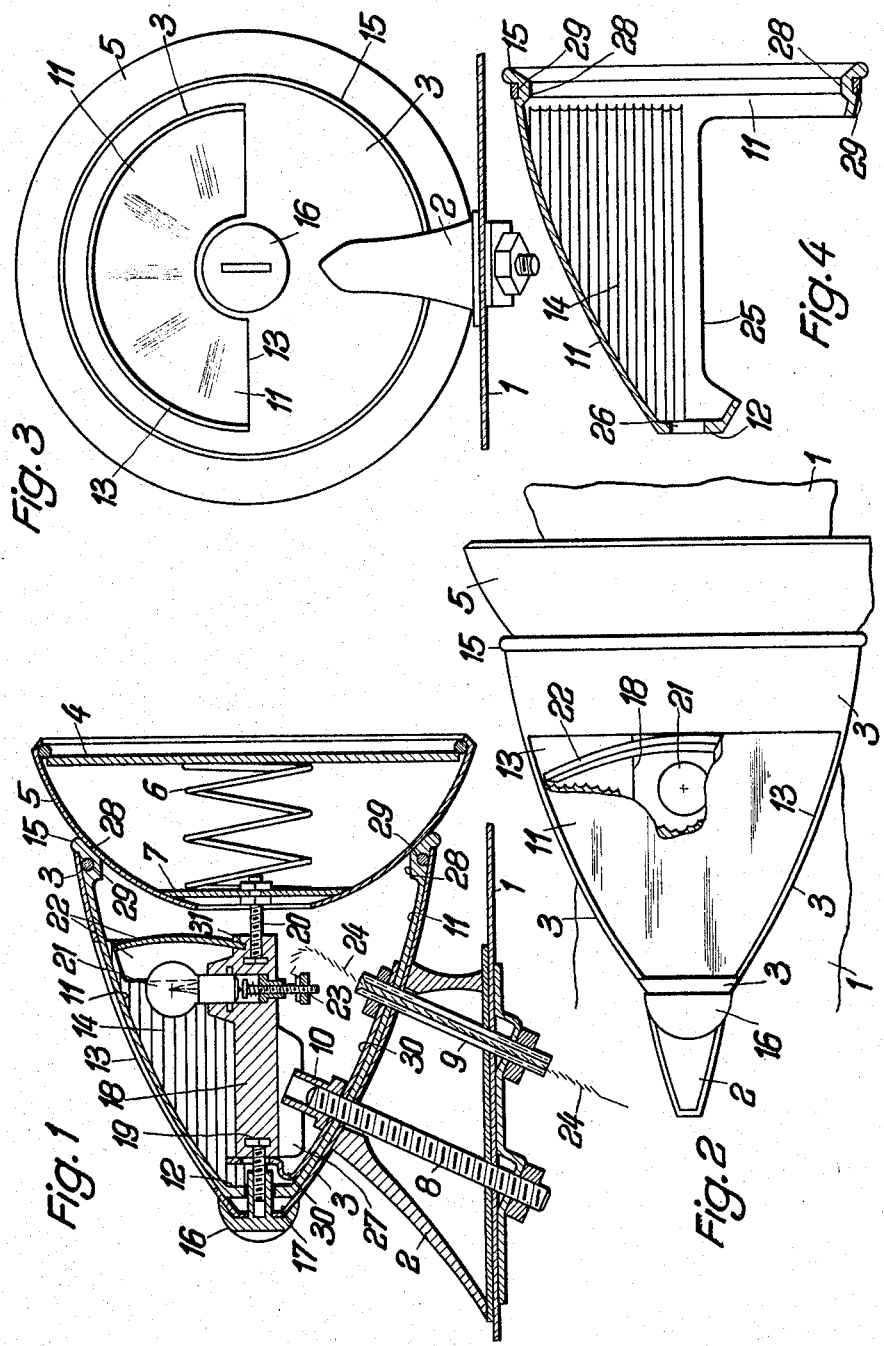

3,265,878
REAR VISION MIRROR ASSEMBLY
FOR A VEHICLE
Yorck Joachim Talbot, 80 Ebersstrasse, Berlin, Germany
Filed Mar. 31, 1964, Ser. No. 356,259
Claims priority, application Germany, Oct. 29, 1963,
T 24,973
4 Claims. (Cl. 240—4.2)

I have previously proposed a rear vision mirror assembly for a vehicle, comprising a housing adapted for being mounted on the body of the vehicle, the housing having mounted thereon a rear vision mirror, and carrying means for holding an electric bulb in such a manner that light is emitted by the bulb in a direction substantially opposite to the direction of rear view given by the mirror, the mirror being carried by an intermediate member which is so mounted in relation to the housing as to be movable relative thereto for varying the direction of rear view given by the mirror without varying the direction in which light is emitted by the bulb.

The object of the present invention is to provide an improvement in or modification of such a rear vision mirror assembly, wherein the housing is in the form of a substantially frustoconical body of rotation, and has a portion which is transparent or translucent at least in part, whereby to provide an outlet for light from the electric bulb, the bulb holding means being in the form of a tensioning member axially movable in the housing and in engagement with a nut at the tip of the housing and with the intermediate member carrying the mirror, in such a manner that by tightening the nut the adjustable intermediate member can be fixed in a desired position relative to the housing.

The housing may have a cut-out which provides the said transparent or translucent portion, the cut-out being covered from the inside thereof in a light transparent manner by an inner part of transparent or translucent material formed as a substantially similarly shaped body of rotation, the said inner part and the intermediate member being connected together and with the housing by the said tensioning member.

The housing may be in the form of a synthetic plastic injection moulded member, formed as a single piece body of rotation and having reinforcing beads and a reinforcing metal ring at its open end, the upper half of the molded member being left transparent at least in part, for emergence of light rays from the electric bulb, the lower half of the molded member being provided with a highly polished coating or being otherwise metallized so as not to be light permeable. Alternatively, the housing may be formed from two halves of bodies of rotation, the lower half being made of electroplated sheet metal and the upper half being made of transparent or translucent synthetic plastic material, the two halves being held together at their rearwardly open side by an external metal ring and at their front ends by a skirt formation provided on the nut.

In order to make the invention clearly understood, reference will now be made to the accompanying drawings which are given by way of example and in which:

FIGURE 1 is a sectional side view of a rear vision mirror assembly for a vehicle; FIG. 2 is a plan view of the mirror assembly of FIG. 1, partly broken away; FIG. 3 is an end view of the mirror assembly, viewed from the left hand side of FIG. 1; and FIG. 4 is a sectional side view of a detail of the mirror assembly.

The external rear vision mirror assembly illustrated comprises a foot part 2 which is screwed onto the vehicle body work 1 by means of threaded bolts 8 and 9, and on the oblique upper surface of which a housing 3 is screwed, the housing being of sheet metal and in the form of a round or alternatively an oval-shaped pressed body of rotation, which is of approximately frustoconical shape.

Into the housing 3, an inner part 11 which accurately fits the same in its external shape, of transparent synthetic plastic, is pushed, an external bead 15 of the inner part 11 lying against the sharp end edge of the housing 3, a cap shaped mirror-carrying member 5 being adjustably supported against an internal bead 28 of the inner part 11. Within this mirror-carrying member 5, a holding plate 7 which is adjustable in known manner, and a compression spring 6 acting between the plate 7 and a mirror 4, are arranged, the spring 6 pressing the mirror 4 against a holding ring which is sprung in. The rim of the inner part 11, which is made of synthetic plastic material is additionally reinforced by a pushed on metal ring 29 and the tip of the inner part 11 extending in the travelling direction is reinforced by a thick base portion 12 thereof.

A window 13 which extends deeply downwards on both sides is cut out of the sheet metal housing 3, it being transparently and tightly covered from the inside by the inner part 11. This, in turn, has internally provided ribbing 14 which serves for better light dispersion, from a lamp 21 mounted in the housing, whereas on its outer surface it is quite smooth.

A stud of a nut 16, which is provided with an internal thread, is pushed through a hole in the tip of the housing 3 and in a hole 26 in the tip of the inner part 11, and is screwed onto a screw 19 fixedly seated in a central tensioning member 18. If the nut 16 is tightened then by means of the tensioning member 18 and a further screw 20, an axial tension is exerted on the holding plate 7 and in this manner an undesired displacement of the mirror-carrying member 5 is rendered impossible. As can be seen, the nut 16 has a conical interior 17 which fits the tip of the housing 3, and by means of which a skirt is formed which engages far over this tip. The purpose of this interior conical formation of the nut 16 is as follows:

The possibility exists of forming the housing 3 and also the transparent inner part 11, not as complete bodies of rotation which are formed in a single piece and are then fitted into each other, but of forming them in each case of two halved bodies of rotation with semicircular cross sections, in such manner that the separating joint between these two half bodies lies in a substantially horizontal plane which is central and parallel to the central axis of the complete body formed from these two half bodies. In such a case the lower half body to be screwed to the foot part 2 would be made of sufficiently strong sheet metal, and the upper half body could be manufactured completely of transparent synthetic plastic material, the upper half body engaging over the sharp edge of the lower half body by means of a channelled formation, so that rain water can smoothly run off. The rearward opening of a composite housing formed by these two half bodies together, is then held together by a strong metal ring applied thereover from the ouside, whereas the front tip of this composite housing is held together by the skirt formed by the conical interior 17 of the nut 16 engaging over the said front tip, the two half bodies being urged towards each other by the action of the conical skirt of the nut 16 on tightening of the nut 16.

As an alternative possibility, a single piece housing representing a complete body of rotation, may be manufactured entirely of transparent synthetic plastic material, and screwed directly together with the foot part 2. In order to strengthen the rearward opening of such a synthetic plastic housing, and to strengthen the housing tip, the rim defining this rearward opening may be provided with an exterior bead 15, an interior bead 28, and a metal ring 29 applied from the outside, and the nut 16 with its conical interior 17 may engage the housing tip over a sufficiently large supporting surface.

In order to allow the light beam from the incandescent lamp 21 to emerge only over the upper housing half, and furthermore in order to give the lower housing half the appearance of a chromium plated metal part, a highly polished metal layer may be vaporized onto the lower part in known manner or the lower part may be provided with a conductive coating of lacquer and then chromium plated. At the region where the nuts 10 engage the two threaded bolts 8 and 9, the wall of the synthetic plastic housing may be reinforced. The pressing force of these nuts may however in any case be taken up and distributed over a larger surface, by a negative contact spring 30 which is provided for earthing the lamp 21.

A resiliently bent up end of this negative contact spring 30 has a sufficiently large hole for the screw 19 and electrically connects the front end of the tensioning member 18 through the threaded bolt 8 with the bodywork 1 of the vehicle. The tensioning member 18 is formed at its upper side as an insulated mount for the incandescent lamp 21, the positive contact of which is connected through a resilient contact screw 23 with a positive supply line 24, which in turn is guided through a bore in the threaded bolt 9 through the shell of the bodywork 1. The tensioning member 18 has at its lower side two parallel ribs 27 and an elongated shank of one of the fixing nuts 10 extends into the channel formed between the ribs 27 in such manner that when tightening the nut 16, the tensioning member 18 and thus the incandescent lamp 21 is not rotated out of its intended position, or these parts cannot be incorrectly assembled. At its rearward end, the tensioning member 18 has an arcuate channel 31 in which a lower margin of a spherically curved reflector 22 of sheet metal is secured. The reflector may, however, alternatively be manufactured as a unitary casting with the tensioning member 18.

The interior part 11, of transparent synthetic plastic material, has a cut-out 25 which extends almost to its central axis and over the greater part of its length, but which however leaves a complete ring remaining at the rearward opening, which is reinforced by the internal bead 28, the external bead 15 and by the metal ring 29 applied over the outer periphery. A member similar to the interior part 11, of transparent synthetic plastic material, but without the cut-out 25, that is to say manufactured as a complete body of rotation, with the above described reinforcements 12, 15, 28 and 29 may alternatively serve by itself as a housing of the assembly, that is to say an additional external housing of sheet metal can be dispensed with. The lower half of such a one piece housing of synthetic plastic should preferably then be covered, by vaporizing a highly polished metal layer thereon or applying a conductive lacquer coating which is then chromium plated. In this case, the nut 16 may be made of a synthetic plastic material which is permeable to light so that a light dispersing lens effect can be achieved.

I claim:

1. A rear view mirror assembly for a vehicle, comprising a housing adapted for being mounted on the vehicle, said housing being in the form of a substantially frustoconical body of rotation and having a portion which is light-transmitting at least in part thereby to provide an outlet for light from an electric bulb, an intermediate member serving to mount a rear view mirror on the housing, said intermediate member being so mounted in relation to the housing as to be movable relative thereto for varying the direction of rear view given by the mirror without varying the direction of light emitted by a bulb, and means for holding an electric bulb in such a manner that light is emitted by the bulb in a direction substantially opposite to the direction of rear view given by the mirror, the bulb holding means being in the form of a tensioning member axially movable in the housing and in engagement with a nut at the tip of the housing and with the intermediate member carrying the mirror, in such a manner that by tightening the nut the adjustable intermediate member can be fixed in a desired position relative to the housing.

2. A rear vision mirror assembly, as claimed in claim 1, wherein the housing has a cut-out which is covered at the inside thereof by an inner part of light-transmitting material formed as a substantially similarly shaped body of rotation, the said inner part and the intermediate member being connected together and with the housing by the said tensioning member.

3. A rear vision mirror assembly, as claimed in claim 1, wherein the housing is in the form of a synthetic plastic injection molded member, formed as a single piece body of rotation and having reinforcing beads and a reinforcing metal ring at its open end, the upper half of the molded member being left transparent at least in part for emergence of light rays from the electric bulb, the lower half of the molded member being made opaque.

4. An external rear vision mirror assembly, as claimed in claim 1, wherein the housing is formed from two halves of bodies of rotation the lower half being made of electroplated sheet metal and the upper half being made of light-transmitting synthetic plastic material, the two halves being held together at their rearwardly open side by an external metal ring and at their front ends by a skirt formation provided on the nut.

References Cited by the Examiner
UNITED STATES PATENTS

| 2,585,399 | 2/1952 | Mead _____ | 240—4.2 |
| 2,752,823 | 7/1956 | Martin et al. _____ | 240—4.2 X |
| 3,214,578 | 10/1965 | Talbot _____ | 240—4.2 |

NORTON ANSHER, *Primary Examiner.*